United States Patent [19]

Lew

[11] Patent Number: 4,546,502

[45] Date of Patent: Oct. 15, 1985

[54] EVAPORATIVE WASTE DISPOSAL SYSTEM

[76] Inventor: Hyok S. Lew, 7890 Oak St., Arvada, Colo. 80005

[21] Appl. No.: 659,163

[22] Filed: Oct. 9, 1984

Related U.S. Application Data

[63] Continuation-in-part of Ser. No. 474,967, Mar. 14, 1983, abandoned.

[51] Int. Cl.⁴ ............................................. A47K 11/02
[52] U.S. Cl. ........................................ 4/449; 4/111.1; 4/111.5; 4/111.6; 4/420
[58] Field of Search ..................... 4/111.1–111.6, 4/449, 321, 315, 318, 317, DIG. 19, 420, 322, 323; 210/532.1, 532.2, 533, 513

[56] References Cited

U.S. PATENT DOCUMENTS

| | | | |
|---|---|---|---|
| 1,224,913 | 5/1917 | Ferguson | 4/321 |
| 3,522,613 | 8/1970 | Botsford | 4/449 X |
| 3,577,568 | 5/1971 | Johonsen et al. | 4/449 X |
| 3,611,447 | 10/1971 | Howard | 4/317 |
| 3,629,099 | 12/1971 | Gahmberg | 4/321 |
| 3,829,909 | 8/1974 | Rod et al. | 4/318 |
| 3,922,730 | 12/1975 | Kemper | 4/318 X |
| 4,097,381 | 6/1978 | Ritzler | 210/513 X |
| 4,122,557 | 10/1978 | Harris | 4/111.4 X |
| 4,205,403 | 6/1980 | Blomkenship | 4/111.1 |
| 4,313,233 | 2/1982 | Roberts | 4/DIG. 19 |
| 4,492,635 | 1/1985 | Stigebrandt | 210/533 |

*Primary Examiner*—Henry K. Artis

[57] ABSTRACT

This invention relates to a process for disposing of human waste wherein the liquid waste is evaporated off and the solid waste is dehydrated for easy disposal. A preseparating toilet bowl roughly separates the urinous wastes and the toilet rinse water from the fecal wastes and other solid wastes dumped into the preseparating toilet bowl. The liquid waste separated from the solid waste flows into an evaporator wherein it is evaporated into the atmosphere by means of air currents circulated through the evaporator. The solid waste drops into a dryer or incinerator wherein it is dehydrated by the heat or vacuum drying process, or a combination thereof, or incinerated by an electric heater or gas burner. The dried solid waste may be bagged and used as a fertilizer or it may be taken to a centralized incinerating plant.

16 Claims, 14 Drawing Figures

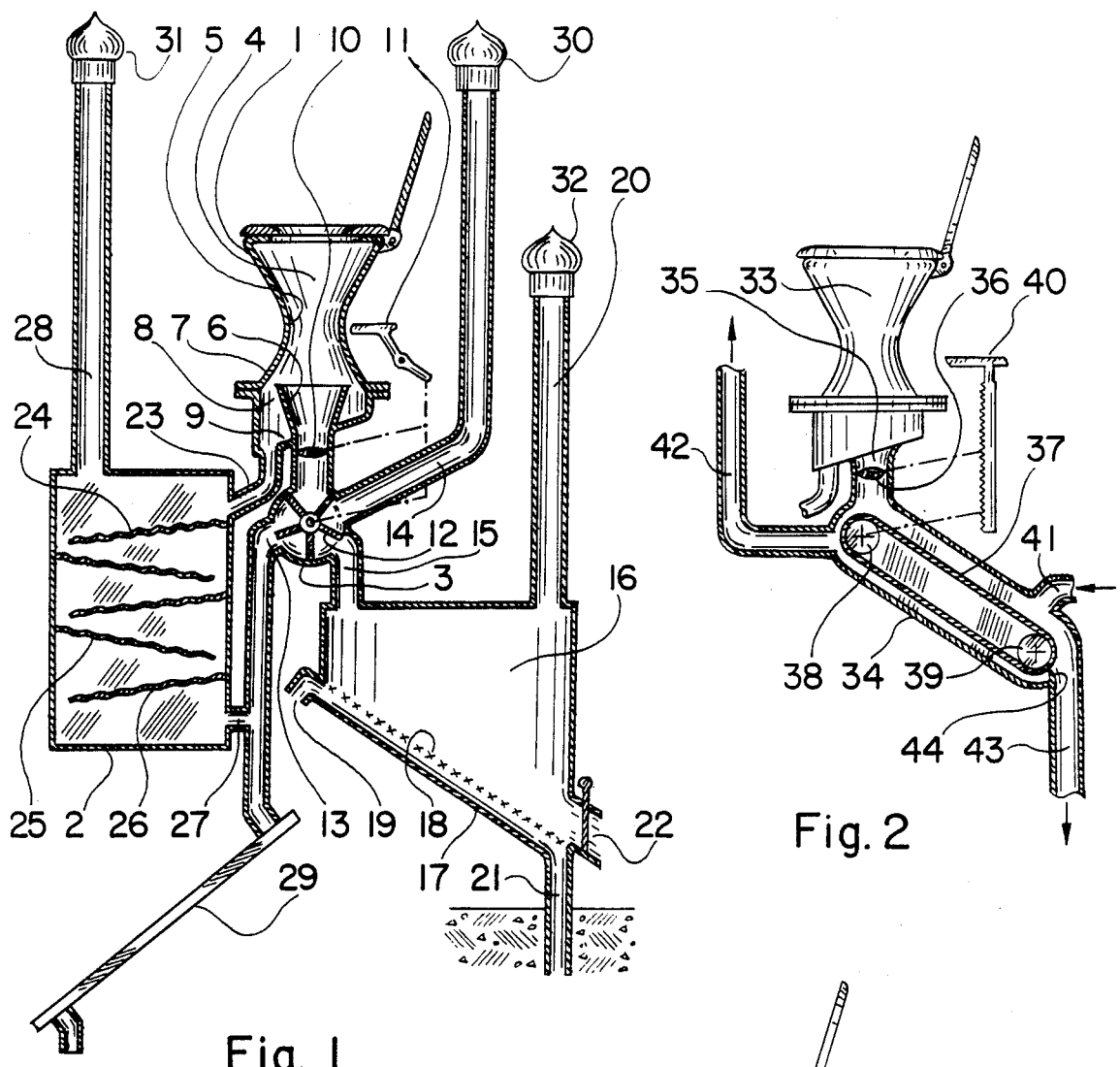
Fig. 1
Fig. 2
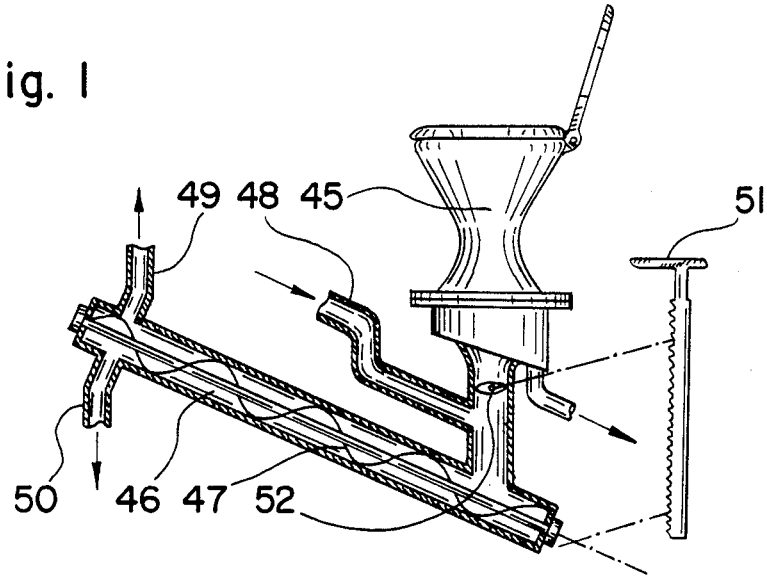
Fig. 3

EVAPORATIVE WASTE DISPOSAL SYSTEM

This application is a continuation-in-part application to patent application Ser. No. 474,967 titled "Evaporative Waste Disposal Process" filed on Mar. 14, 1983, now abandoned.

BACKGROUND OF THE INVENTION

The water toilet has been accepted and used as a standard method for disposing of human waste from private dwellings, office and industrial buildings, etc. Certainly the water toilet does the job involving messy material in a neat and clean manner and, consequently, the water toilet has become an indispensible element in the high standard of living in modern society. As the population of the human race grows out of bounds and our life style demands an ever increasing amount of water for use in households and industries, it is becoming more and more clear that water is not the boundless abundant resource that it was before, and there is little doubt that water will become an expensive commodity in the future when there is not enough of it to go around. In average households, about forty five percent of the total amount of the water used daily is wasted to flush the toilet. Firstly, it does not make sense to waste forty five percent of the water used daily by each household to flush out waste while we are talking and worrying about dwindling water resources. Secondly, it is downright unwise to mix a small amount of human waste with large amounts of clean water and then spend a large amount of resources to build a network of sewer pipes and waste treatment plants to separate the clean water from the waste. Thirdly, it is less than intelligent to dump the waste effluent into streams and rivers and, then to argue and worry about polluting natural water resources.

The major portion of the water problems confronting us today can be resolved and eliminated by ridding ourselves of the habit of using the water toilet. We have been sophisticated enough to mobilize a vast amount of technology and social resources to cope with the water pollution problems created by our water toilet, yet no one has seriously questioned whether it is necessary to have these problems at all. Indeed, it is a common folly of many experts who try frantically to find an expensive solution to the problem, but fail to examine the rationality of the problem. It should be mentioned that a number of solutions have been addressed to the problem of wasting water and polluting water resources resulting from the use of water toilets. The compost toilet does not use any water. However, it lacks cleanliness and leaves messy end products of compost. It is quite doubtful that the compost toilet will ever be accepted by a civilized society used to the water toilet. The incinerating toilet of present day technology burns off the solid waste as well as the liquid waste and, consequently, does not use any water and leaves no end product. The use of the incinerating toilets in masses is unacceptable because it constitutes a fire hazard in private dwellings, is too energy-intensive and creates a serious problem of air pollution. There are recycling toilets which recycle the water or oil used to flush the toilet. These recycling toilets require an initial capital investment and operating/maintenance costs too high for average households. Furthermore, the recycling toilet does not solve the problem in essence because it leaves messy end products which have to be processed by other means. In conclusion, all of the nonconventional toilet technology available today is not good enough to replace the conventional water toilet.

SUMMARY OF THE INVENTION

The primary object of the present invention is to provide a toilet that uses little or no water, while still being as clean as the water toilet.

Another object of the present invention is to provide a toilet that leaves no end products or an end product that is useful and easy to handle.

A further object of the present invention is to provide a preseparating toilet bowl that roughly separates the liquid waste from the solid waste.

Yet another object of the present invention is to provide a toilet system including a liquid waste evaporator that evaporates off the liquid waste separated from the solid waste by the preseparating toilet bowl.

Yet a further object of the present invention is to provide a toilet system including a solid waste dehydrator that dries the solid waste separated from the liquid waste by the preseparating toilet bowl.

Still another object of the present invention is to provide a toilet system including a solid waste incinerator that burns off the solid waste separated from the liquid waste by the preseparating toilet bowl.

Still a further object of the present invention is to provide a toilet system including means for dispensing the dehydrated solid waste out of the solid waste dehydrator.

These and other objects of the present invention will become clear as the description thereof proceeds.

BRIEF DESCRIPTION OF FIGURES

The present invention may be described with a greater clarity and specificity by referring to the following figures:

FIG. 1 illustrates a schematic drawing of an embodiment of the present invention that operates without electricity.

FIG. 2 illustrates a schematic drawing of another embodiment of the present invention that operates without electricity.

FIG. 3 illustrates a schematic drawing of a further embodiment of the present invention that operates without electricity.

DESCRIPTION OF THE PREFERRED EMBODIMENTS

Figure 4:
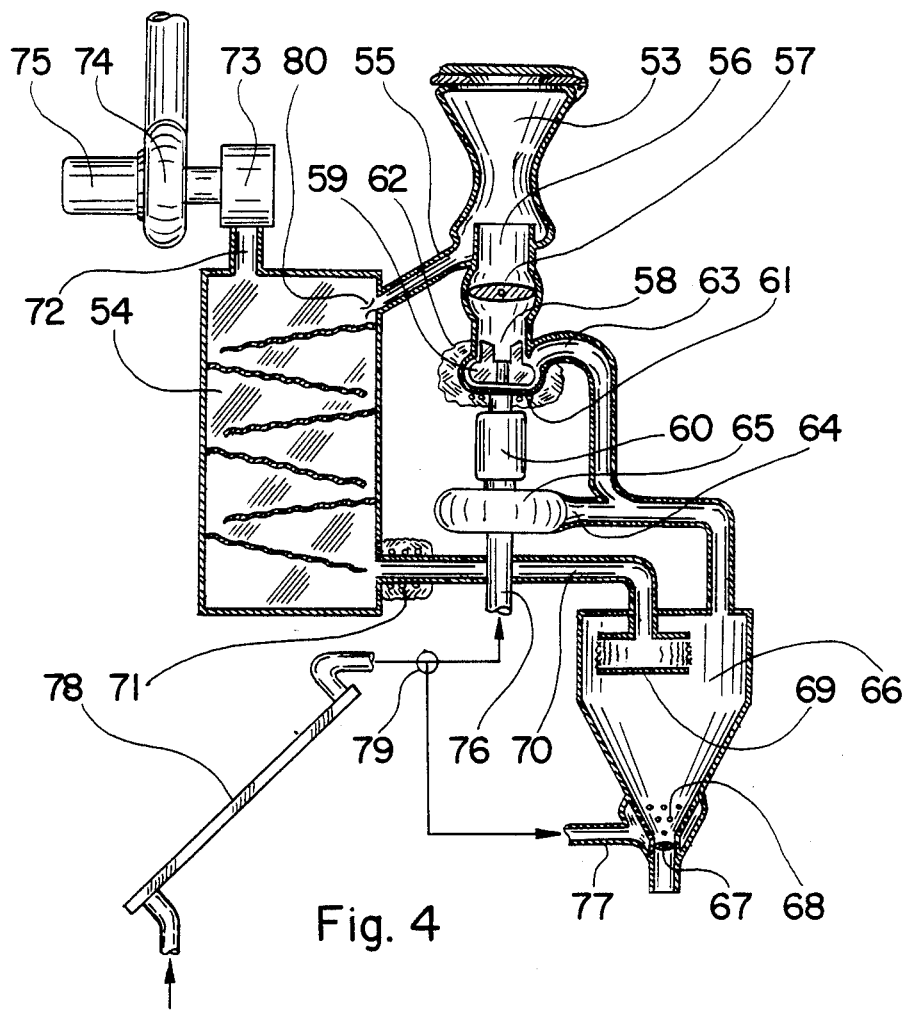
FIG. 4 illustrates a schematic drawing of an embodiment of the present invention that requires a power source such as electricity.

In FIG. 1 there is shown a schematic drawing illustrating the arrangement of the elements and the operating principles of an embodiment of the present invention, which embodiment is suitable for installation in an area without electric power such as national parks, rest stations, etc. The principal elements comprising the evaporation toilet system shown in FIG. 1 include a preseparating toilet bowl 1, a liquid waste evaporator 2 and a solid waste dryer 3. The preseparating toilet bowl 1 includes the familar funnel-shaped bowl 4 with a seat and cover and a converging-diverging tubular shell 5 smoothly connected to the bottom 4 of the funnel-shaped toilet bowl 1. A solid waste inlet tube 6 having an inlet opening with a diameter substantially greater than the throat section diameter of the converging-diverging bottom 5 of the toilet bowl 1 is disposed within the diverging end of the toilet bowl bottom 7 in a coaxial arrangement with respect to the toilet bowl. The inlet opening diameter of the solid waste inlet tube 6 is substantially less than the inside diameter of the diverging end of the toilet bowl bottom and, consequently, an annular gap 8 is provided between the inner wall of the diverging end of the toilet bowl bottom and the inlet opening of the solid waste inlet tube. The annular gap 8 terminates to a liquid waste collector pan 9 that collects the liquid waste and empties it to the liquid waste evaporator 2. The solid waste inlet tube 6 is connected to the solid waste dryer 3 wherein an airlock valve or damper disc 10 cuts off the air movement between the solid waste dryer 3 and the toilet bowl 1. The airlock valve or damper disc 10 is mechanically linked to an activating device such as a foot pedal 11 in such a way that it automatically stops at the fully closed position after a one hundred eighty degree rotation on each activation. The solid waste dryer 3 includes a rotary divider 12 having a plurality of compartments. The partitioning walls of the rotary divider 12 includes means such as a plurality of vent holes disposed therethrough for allowing air circulation. The rotary divider 12 is mechanically linked to an activating device such as the foot pedal 11 in such a way that the rotary divider 12 advances by one compartment on each activation. The solid waste dryer 3 includes an air inlet tube 13, an air outlet tube 14 and a solid waste outlet tube 15. The rotary divider 12 lifts up and dumps out the fully or partially dried solid wastes into a solid waste storage bin 16 equipped with a sloping bottom 17 and a mesh screen 18 disposed there-above. The solid waste storage bin 16 includes an air inlet 19, an air outlet 20, a drain pipe 21 and a discharge gate 22. The liquid waste flows from the liquid waste pan 9 into the liquid waste evaporator 2 through a liquid waste pipe 23 and is dumped on the top evaporator tray 24 that is one of a plurality of the evaporator trays 25, 26, etc. substantially horizontally disposed in the liquid waste evaporator in a multilevel arrangement. The liquid waste evaporator 2 includes an air inlet 27 disposed at the lower portion thereof and an air outlet 28 disposed at the upper portion thereof. The air inlet 13 into the solid waste dryer 3 and the air inlet 27 into the liquid waste evaporator 2 may be connected to a device such as a solar collector 29 that heats the air circulated through the liquid waste evaporator 2 and the solid waste dryer 3. The air outlet 14 from the solid waste dryer 3, the air outlet 28 from the liquid waste evaporator 2 and the air outlet 20 from the solid waste storage bin 16 may include fans 30, 31 and 32, respectively, which may be wind powered fans or electric motor driven fans. Two or more air outlets may be merged to a single air duct including a single fan, which arrangement helps to reduce the number of the fans required to operate an evaporation toilet. It should be understood that the throat section of the converging-diverging tubular bottom 5 of the toilet bowl 1 provides a smooth and continuous transition from the converging section to the diverging section. The liquid waste discharged from a person sitting on the toilet bowl 1 lands on the converging wall of the toilet bowl 1 and flows down following the converging-diverging surface of the toilet bowl bottom due to the surface tension of the liquid waste, wherein the liquid waste collected in the liquid waste pan 9 flows into the liquid waste evaporator 2 through the liquid waste pipe 23 by gravity. The liquid waste dumped into the liquid waste evaporator 2 spreads on the top of one or more evaporator trays which produce the air-liquid waste interface of very large area. The air circulated through the liquid waste evaporator 2 naturally or forcibly evaporates the liquid waste into the atmosphere. The residual solid particles deposited on the evaporator trays left out by the evaporating liquid waste should be cleaned out once or twice every year. The solid waste discharged into the toilet bowl 1 from a person sitting on the toilet bowl 1 is funneled through the throat section of the converging-diverging tubular bottom 5 of the toilet bowl 1 and drops into the solid waste inlet tube 6 wherein the solid waste lands on top of the damper disc 10. When activating means such as the foot pedal 11 is pressed by the person using the toilet, the damper disc 10 rotates one hundred eighty degrees and, consequently, the solid waste is dumped into one compartment of the rotary divider 12 located directly under the damper disc 10. The air circulated through the solid waste dryer 3 dehydrates the solid wastes which are stored in the plurality of compartments included in the rotary divider in a distributed manner. The fully or partially dried solid wastes are discharged into the solid waste storage bin 22 through the solid waste outlet tube 15 by the rotating movement of rotary divider 12 that rotates intermitently in a counter clockwise direction in the specific embodiment shown in FIG. 1. The sole object of the rotary divider 12 is to spread out the solid wastes and thus to prevent the piling up of the solid waste. This is necessary to enhance the dehydration of the solid wastes. It is quite obvious that a round rotary table installed under the damper disc 10 in an off set relationship serves the same purpose as the rotary divider, wherein a stationary wiper wiping the rotary table top discharges the dried solid wastes into the solid waste storage bin. The solid waste dumped into the solid waste storage bin 16 is further dried and oxidized by the air percolated therethrough. Any excess liquid waste discharged with the solid waste is automatically drained through the drain pipe 21. The dried solid waste stored in the solid waste storage bin 16 is regularly removed through the discharge gate 22. It is advisable to coat the surfaces in contact with the solid wastes in the preseparating toilet bowl and in the solid waste dryer 3 with a lining such as the teflon coating; whereby, the evaporation toilet can be operated without requiring an excessive amount of cleaning and up-keep. It should be understood that the particular embodiment of the evaporation toilet shown in FIG. 1 is for installation in a remote area without electric power. The embodiment of the evaporation toilet utilizing electric power can be much more sophisticated than the embodiment shown in FIG. 1.

In FIG. 2 there is illustrated a schematic drawing showing a preseparating toilet bowl 33 equipped with a solid waste dryer 34 of another embodiment. The preseparating toilet bowl 33 has the same elements and construction as the element 1 in FIG. 1, wherein the solid waste inlet tube 35, including a damper disc 36 is connected to the solid waste dryer 34 that includes a belt conveyer 37 which is intermittently advanced by one of two drum pulleys 38 and 39 mechanically linked to an actuator such as the food pedal 40 that also operates the damper disc 36. The belt conveyer 37 is intermittently rotated in a clockwise direction whenever the foot pedal 40 is pressed down by the user of the toilet, which action spreads the solid wastes from different users of the toilet over the length of the belt conveyer 37 and thus enhances dehydration of the solid wastes. The air circulated through the solid waste dryer enters through an air inlet 41 and leaves through an air outlet 42. The fully or partially dried solid wastes are discharged through a solid waste outlet tube 43 by gravity. A belt wiper 44 keeps the conveyor belt 37 clean. It should be understood that the solid waste dryer 34 and the conveyor belt 37 may be arranged to slope down as shown in FIG. 1 or to slope up or in a substantially horizontal position. It is not difficult to realize that the combination of the separating toilet bowl 32 and the solid waste dryer 34 can replace the corresponding combination shown in FIG. 1 and be connected to the liquid waste evaporator and the solid waste storage bin as illustrated in FIG. 1.

In FIG. 3 there is shown a preseparating toilet bowl 45 having the same elements and construction as element 1 shown in FIG. 1, that is connected to a solid waste dryer 46 including a screw conveyer 47, an air inlet 48, an air outlet 49 and a solid waste outlet tube 50. The screw conveyor 47 may be operated by a foot pedal 51 that also operates the damper disc 52 or other actuator means such as electric motor.

In FIG. 4 there is shown a schematic drawing illustrating another embodiment of the evaporation toilet of the present invention that is suitable for installation in private dwellings, offices and industrial buildings, etc., where electric power is available. In this embodiment, the preseparating toilet bowl 53 comprising the same elements and construction as the preseparating toilet bowl 1 of FIG. 1 is connected to the liquid waste evaporator 54 having the same elements and construction as the liquid waste evaporator 2 of FIG. 1 by the liquid waste pipe 55. The solid waste inlet tube 56 extending from the bottom of the preseparating toilet bowl 53 includes a damper disc 57 and is connected to the solid waste dryer 58 that includes a pulverizer-blower 59 driven by an electric motor 60. The solid waste dryer 58 further includes heating means 61 such as the electric heating coils or the gas heater or other heat transfer means and is insulated by the insulating material 62 to prevent heat loss during the heat drying cycle. The solid waste outlet tube 63 originating from the solid waste dryer 58 merges with the air outlet tube 64 originating from an air blower 65 that is also driven by the pulverizer-blower motor 60, wherein two merged tubes are connected to the top of the solid waste storage bin 66. The solid waste storage bin 66 includes a discharge gate 67, aerating bottom 68 and a filter 69 connected to the air outlet tube 70 that originates from the upper portion of the solid waste storage bin 66 and is connected to the bottom portion of the liquid waste evaporator 54. A heating means 71 preheating the air entering the liquid waste evaporator 54 is included to provide an additional avenue to enhance the evaporation of the liquid waste. The air outlet tube 72 originating from the upper portion of the liquid waste evaporator 54 includes a filter 73 and a blower 74 driven by an electric motor 75. The air supplied to the inlet 76 of the blower 65 and the inlet 77 of the aerating bottom 68 of the solid waste storage bin 66 may be preheated by a solar collector 78 and controlled by a three-way valve 79. When a user of the toilet activates the actuator operating the damper disc 57, which may be a foot pedal or a switch controlling an electric solenoid that operates the damper disc 57, the solid waste is dumped into the solid waste dryer and the heating means 61 becomes activated. When the solid waste dumped into the solid waste dryer is completely dehydrated by the heat supplied by the heating means 61 that is sensed by a temperature sensor or humidity sensor installed in the solid waste dryer, the electric motor 60 is turned on automatically. The pulverizer-blower 59 breaks down the dried solid wastes and blows out the broken-down solid wastes. The suction effect created by the air stream being discharged from the blower 65 helps to empty the solid waste dryer of the dried solid wastes, which is then transported pneumatically and dumped into the solid waste storage bin 66. The duration of operation of the electric motor 60 driving the pulverizer-blower 59 and the blower 65 should be preset. The solid waste stored in the solid waste storage bin 66 is further dried and oxidized by the aeration resulting from the air circulation provided by the combination of the aerating bottom 68 of the solid waste storage bin 66 and the suction blower 74, which creates air circulation through the solid waste storage bin 66 and the liquid waste evaporator 54. The air circulated through the liquid waste evaporator 54 may be heated by the solar collector 78 or by the heating means 71 disposed at the air inlet to the liquid waste evaporator 54. The liquid waste pipe 55 includes an outlet orifice 80 that limits the air flow therethrough while allowing the uninterrupted flow of the liquid waste. When the blower 74 is turned on by a person about to use the toilet, it causes a small amount of air to be sucked into the toilet that prevents odor from spreading out to the room from the toilet bowl. The duration of the operation of the blower 74 may be pretimed or controlled by a humidity sensor installed in the liquid waste evaporator 54. The three-way valve 79 is used to activate or by-pass the aeration of the solid wastes stored in the solid waste storage bin 66.

Figures 5, 6:
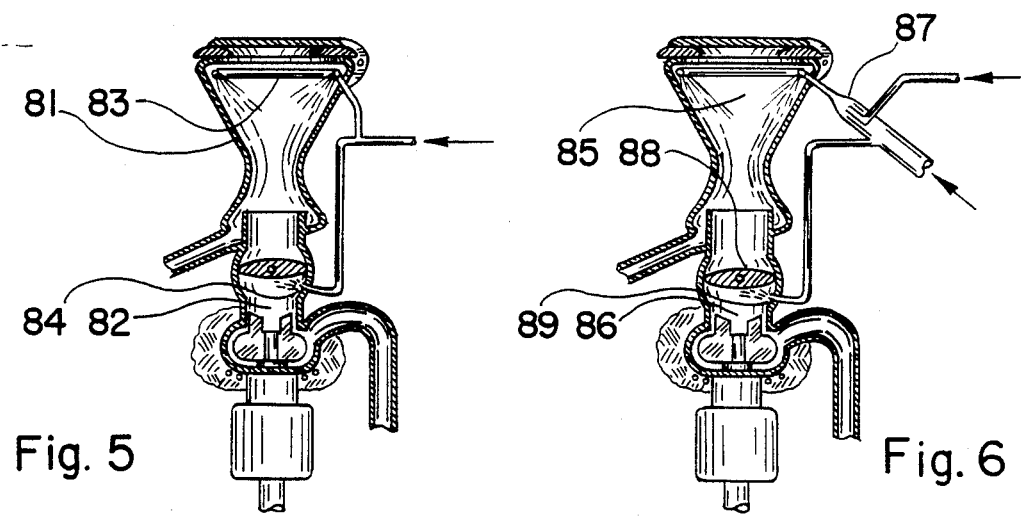
FIG. 5 illustrates a cross section of an embodiment of the preseparating toilet bowl of the present invention equipped with a solid waste dehydrator.
FIG. 6 illustrates a cross section of another embodiment of the preseparating toilet bowl of the present invention equipped with a solid waste dehydrator.

In FIG. 5 there is illustrated a cross section of the combination of a preseparating toilet 81 and a solid waste dryer 82 having the same construction as that described in conjunction with FIG. 4. The combination shown in FIG. 5 includes a toilet rinsing system comprising a rinse water spray ring 83 for rinsing the toilet bowl 81 and a spray nozzle 84 for rinsing the damper disc after and/or before each use of the toilet.

In FIG. 6 there is shown a cross section of the combination of a preseparating toilet bowl 85 and a solid waste dryer 86 having essentially the same construction as that shown in FIG. 5. In this embodiment, the toilet bowl rinsing spray system uses compressed air assisted water jet created by an eductor that creates water sprays energized by compressed for cleaning the toilet bowl. In the particular embodiment shown in FIG. 6, the damper disc 88 is cleaned by the compressed air discharged through the air nozzle 89. Of course, the airwater mixture spray can be used to clean the damper disc 88 by branching off the spray nozzle 89 from a downstream point of the eductor 87.

Figure 7:
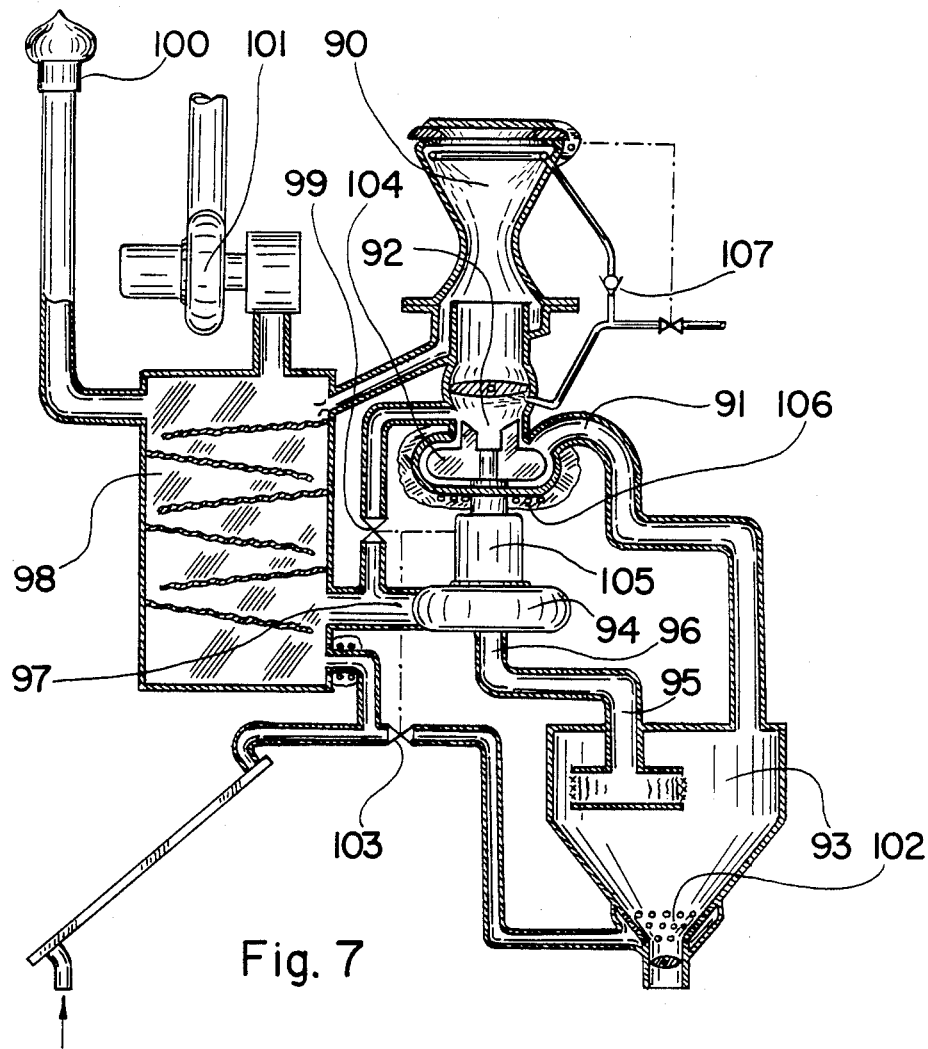
FIG. 7 illustrates a schematic drawing of another embodiment of the present invention that requires a power source such as electricity.

In FIG. 7 there is shown a schematic drawing illustrating another embodiment of the evaporation toilet that utilizes electric power which includes essentially the same elements and arrangements as that shown in FIG. 4 with the following exception: The preseparating toilet bowl 90 includes a spray rinsing system as explained in conjunction with FIGS. 5 and 6. The solid waste outlet tube 91 originating from the solid waste dryer 92 is directly connected to the solid waste storage bin 93 without being merged with the air outlet tube of the blower 94. The air outlet tube 95 from the solid waste storage bin 93 is connected to the air inlet tube 96 of the blower 94 and the air outlet tube 97 of the blower 94 is connected to the lower portion of the liquid waste evaporator 98 wherein a part of the air discharged from the blower 94 is fed back to the solid waste dryer 92 through a valve 99. The liquid waste evaporator 98 includes a wind driven exhaust fan 100 in addition to an electric motor driven fan 101. The air supply to the aerating bottom 102 of the solid waste bin 93 is controlled by a two-way valve 103. The embodiment of the evaporation toilet illustrated in FIG. 7 may operates in two different modes. In the first mode, the pulverizer-blower 104 as well as the air blower 94 is directly driven by an electric motor 105. The pulverizer-blower 104 and the air blower 94 operate only during a cycle emptying the dried solid wastes out of the solid waste dryer 92 that is carried out by the pulverizing and blowing action created by the pulverizer-blower 104 and the suction out of the solid waste dryer 92 created by the air blower 94, in which cycle the valve 99 stays open while the valve 103 stays closed. The air circulation through the solid waste storage bin 93 and the liquid evaporator 98 is provided by the echaust fan 100 or 101. The valve 99 stays closed and the valve 103 stays open when the electric motor 105 is not in operation. In the second mode of operation, the pulverizer-blower 104 is connected to the motor 105 through a clutch, while the air blower 94 is directly connected to the motor 105. During the drying cycle of the solid waste, the clutch driving the pulverizer-blower 104 remains disconnected while the air blower 94 is turned on wherein both valves 99 and 103 stay closed. As a consequence, the air blower 94 creates a partial vacuum in the solid waste dryer 92, which, in combination with the heat supplied by the heating means 106 dehydrates the solid wastes rapidly. The check valve 107 included in the rinse water supply tube is to assist the build up of a partial vacuum in the solid waste dryer 92. When the solid waste is fully dehydrated, the clutch driving the pulverizer-blower 92 is engaged and the valve 99 is opened whereupon the dried solid wastes are pneumatically transported into the solid waste storage bin 93. In both modes of operation, the liquid waste is evaporated into the atmosphere by the air circulated throuth the liquid waste evaporator.

Figures 8, 9:
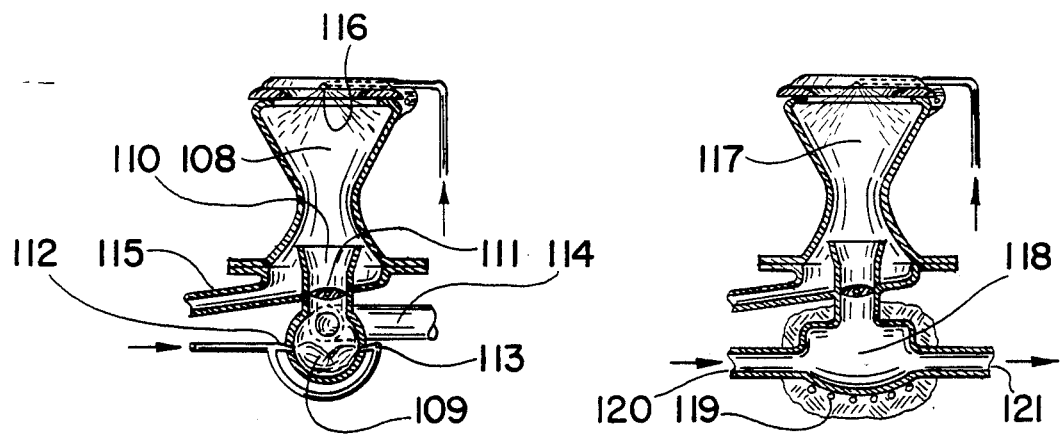
FIG. 8 illustrates a cross section of an embodiment of the preseparating toilet bowl of the present invention equipped with a solid waste incinerator.
FIG. 9 illustrates a cross section of another embodiment of the preseparating toilet bowl of the present invention equipped with a solid waste incinerator.

In FIG. 8 there is illustrated a cross section of a preseparating toilet bowl 108 combined with a solid waste incinerator 109. The solid waste inlet tube 110 including an air-lock valve or damper disc 111 is connected to the incinerator chamber 109 including a plurality of flame nozzles 112, 113, etc. disposed on the cylindrical wall of the incinerating chamber 109, which also includes an exhaust tube 114 disposed through one end wall of the incinerator chamber 109. The liquid waste separated from the solid waste flows into the liquid waste evaporator connected to the liquid waste pipe 115, while the solid waste accumulated on top of the air-lock valve 111 is dumped into the solid waste incinerator chamber 109 wherein it is burned off and the ashes and gases are exhausted through the exhaust tube 114. The preseparating toilet bowl 108 includes a rinse water spray nozzle 116 installed on the bottom side of the toilet bowl cover.

In FIG. 9 there is illustrated a cross section of a preseparating toilet bowl 117 coupled with a solid waste incinerator 118 that includes a plurality of electric heating coils 119. An air inlet 120 and an exhaust tube 121 are connected to two opposite end walls of the incinerating chamber 118, respectively. The incinerating chamber is insulated to prevent the heat loss to the ambient atmosphere.

Figure 10:
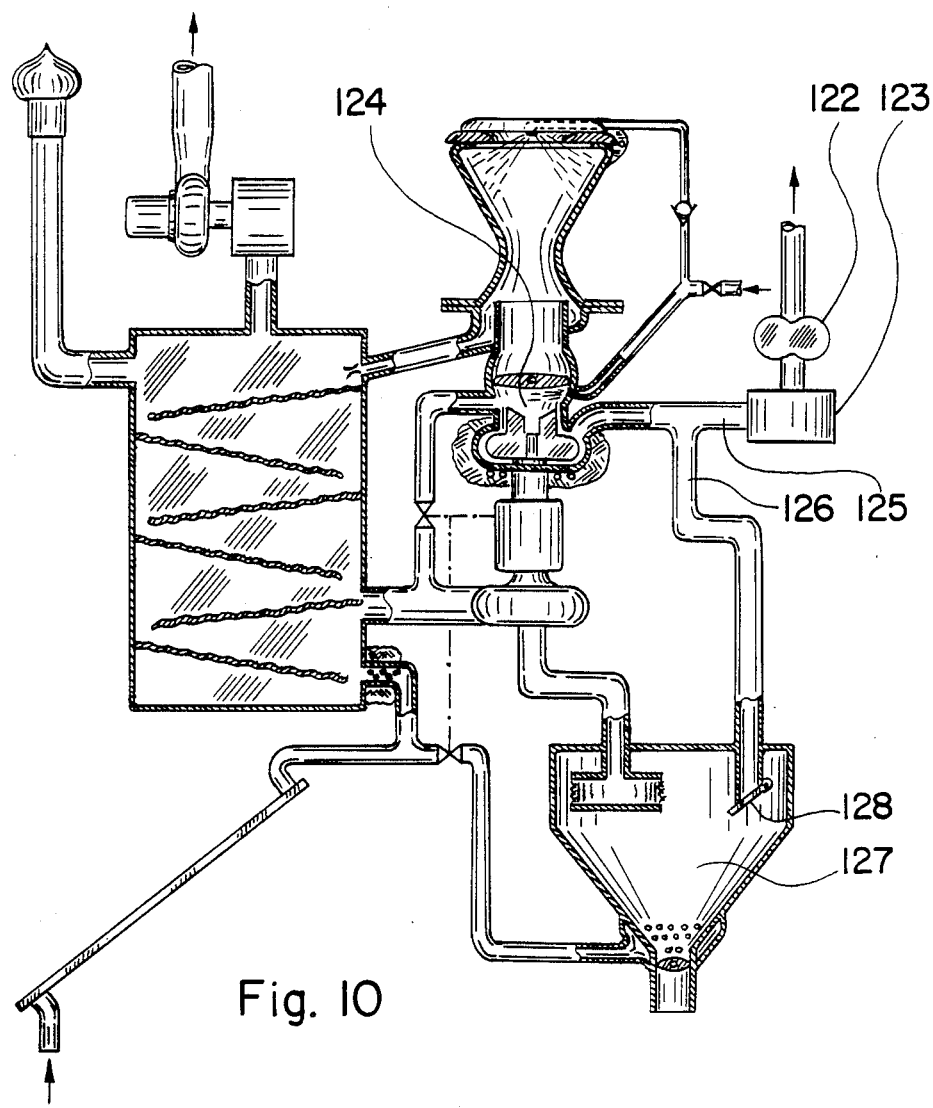
FIG. 10 illustrates a schematic drawing of a further embodiment of the present invention that requires a power source such as electricity.

In FIG. 10 there is shown a schematic drawing illustrating a further embodiment of the evaporation toilet which includes essentially the same elements and arrangements as that shown in FIG. 7 with one exception being that a vacuum pump 122 equipped with a filter 123 provides an evacuated state in the solid waste dryer 124 during the heat-vacuum drying cycle of the solid waste. The inlet tube 125 of the vacuum pump 122-filter 123 branches off from the solid waste oulet tube 126 originating from the solid waste dryer 124 and terminating at the solid waste storage bin 127. The solid waste outlet tube 126 includes a flap type check valve 128 disposed at the discharge end thereof, wherein the check valve 128 prevents the back flow from the solid waste storage bin 127 to the solid waste outlet tube 126. The embodiment shown in FIG. 10 operates in the same principles as the first mode of operation of the embodiment shown in FIG. 7 with one exception being that a partial vacuum is created in the solid waste dryer 124 during the solid waste drying cycle by the vacuum pump 122.

Figure 11:
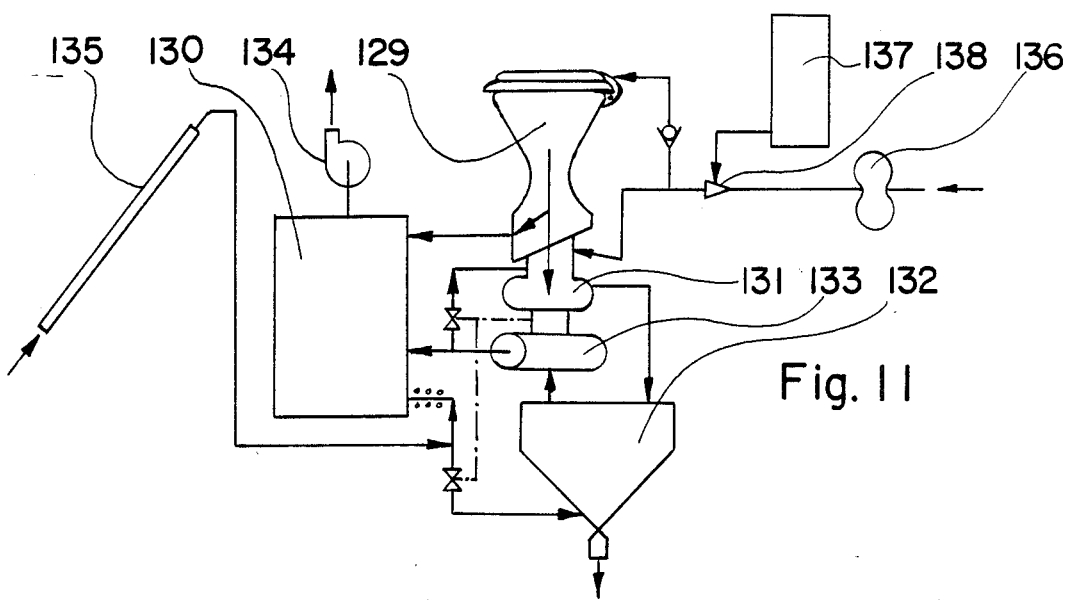
FIG. 11 shows a process flow diagram of an embodiment of the present invention.

In FIG. 11 there is shown a process flow diagram illustrating an embodiment of the evaporation toilet system. A preseparating toilet bowl 129 roughly separates the liquid waste from the solid waste wherein the liquid waste is discharged into a liquid waste evaporator 130 while the solid waste is dumped into a solid waste dryer 131. The solid waste is dehydrated in the solid waste dryer by means of heating or partial evacuation or a combination thereof and pulverized dried solid wastes are pneumatically transported into a solid waste storage bin 132. The pulverizing and pneumatic transportation of the dried solid wastes is carried out by the pulverizer-blower installed in the solid waste dryer 131 and an air blower 133. The fully or partially dehydrated solid wastes stored in the solid waste storage bin 132 is further dehydrated and oxidized by aeration provided by air percolated through the solid wastes stored in the solid waste storage bin 132, which is regularly emptied. The liquid waste discharged into the liquid waste evaporator 130 is evaporated into the atmosphere wherein the evaporation process is promoted by a suction fan 134 forcibly circulating air through the liquid waste evaporator 130. The same suction fan 134 also provides air circulation through the solid waste storage bin 132. The air circulated through the liquid waste evaporator 130 as well as through the solid waste storage bin 132 may be preheated by heating means such as a solar collector 135. An air compressor 136 is employed to produce a compressed-air energized water spray that cleans the preseparating toilet bowl. The water is siphoned from a storage tank and mixed with compressed air by an eductor 138. Of course, the toilet bowl may be cleaned by a simple water spray produced by the municipal water supply under pressure. For the detail of the construction of the elements inlcuded in the evaporation toilet system shown in FIG. 11, one may refer to FIGS. 6 and 7.

Figures 12, 13, 14:
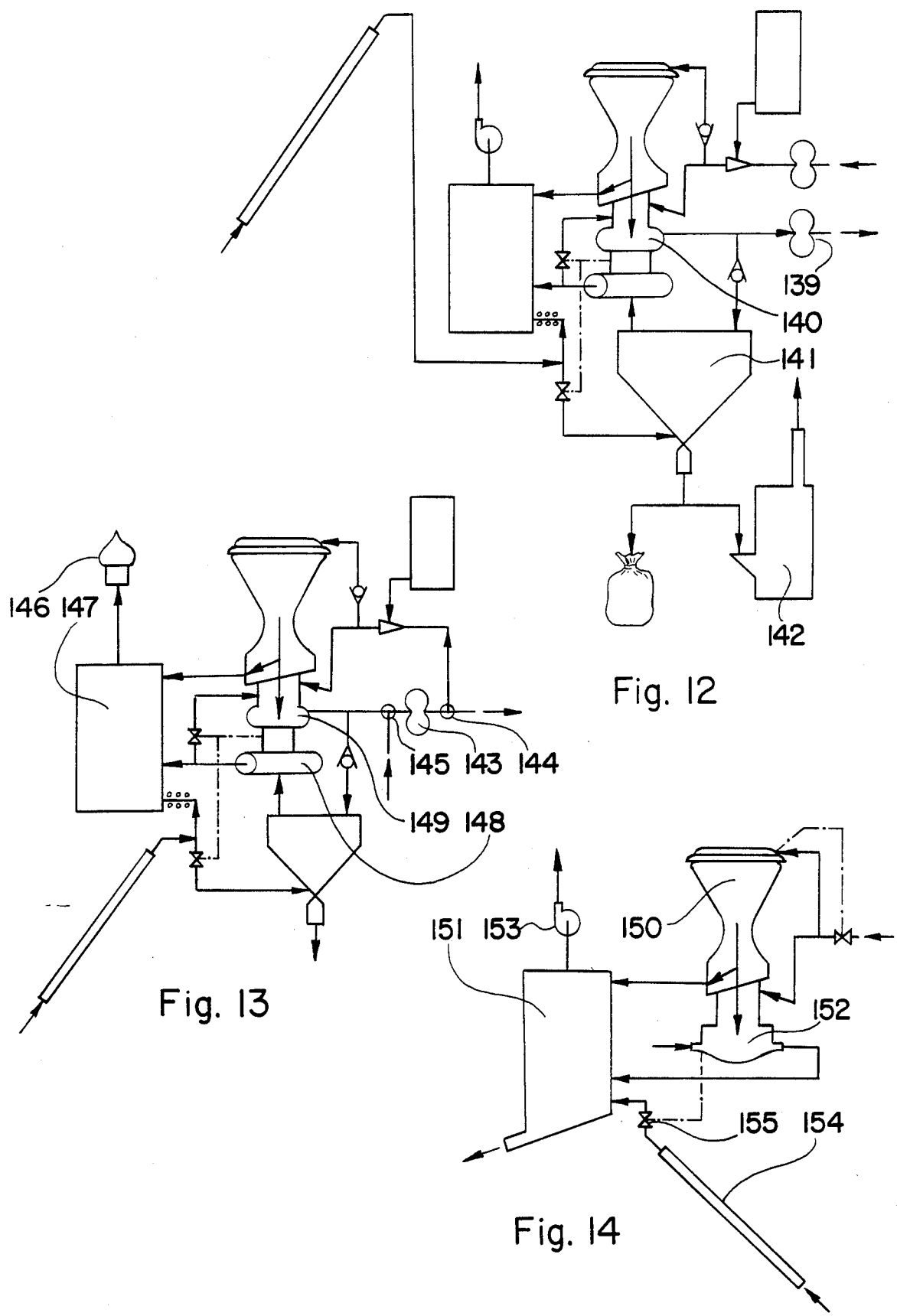
FIG. 12 shows a process flow diagram of another embodiment of the present invention.
FIG. 13 shows a process flow diagram of a further embodiment of the present invention.
FIG. 14 shows a process flow diagram of yet another embodiment of the present invention.

In FIG. 12 there is illustrated a process flow diagram of another evaporation toilet system which is essentially the same as that shown in FIG. 11 with one exception being that a vacuum pump 139 produces a vacuum in the solid waste dryer 140 that accelerates the dehydration process of the solid waste. The vacuum pump 139 may be used as the sole means for drying or in conjunction with other heating means in drying the solid waste. The dried and oxidized solid waste stored in the solid waste storage bin 141 may be bagged for removal or incinerated in an incinerator 142 that may be remotely located or permanently installed in conjunction with the solid waste storage bin 141. For the detail of the construction of the elements included in this process flow diagram, one should see FIG. 10.

In FIG. 13, there is shown a process flow diagram showing essentially the same embodiment as that of FIG. 12 with one exception being that a single compressor 143 operating in conjunction with a pair of control valves 144 and 145 provides a partial vacuum in the solid waste dryer during the drying cycle and supplies compressed air to the rinsing spray system during the cleaning cycle. The air circulation through the liquid waste evaporator 147 is provided either by the wind powered exhaust fan 146 or by the air blower 148 driven by an electric motor that also drives the pulverizer-blower installed in the solid waste dryer 149 through a clutch.

In FIG. 14 there is shown a process flow diagram of an evaporation-incinerating toilet system. A preseparating toilet bowl 150 that roughly separates the liquid waste and the solid waste from one another discharges the liquid waste into the liquid waste evaporator 151 and dumps the solid waste into the solid waste incinerator 152. The exhaust fan 153 circulates air preheated by a heating means such as a solar collector 154 through the liquid waste evaporator 151 and also assists to suck out ashes and gases from the solid waste incinerator 152. The valve 155 closes during the incinerating cycle. The liquid waste evaporator 151 has essentially the same construction as that shown in FIG. 4 with one exception being the sloping bottom thereof which is for collecting the ashes exhausted from the solid waste incinerator 152. The combination of the preseparating toilet bowl 150 and the solid waste incinerator 152 included in this process flow diagram is further illustrated in FIG. 8 or FIG. 9. The evaporation-incinerating toilet system shown in FIG. 14 provides an overwhelming advantage over the conventional incinerating toilet in view that the former requires much less energy and results in much less air pollution compared with the latter. It should be understood that the heat source preheating the air circulated through the liquid waste evaporator 151 may be exhaust gases from an internal combustion engine or flue gas from a furnace.

While the principles of the present invention have now been made clear by the illustrative embodiments, it will be immediately obvious to those skilled in the art that many modifications of the structures, elements, arrangement, proportions and materials which are particularly adapted to a specific working environment and operating condition in the practice of the invention are possible without departing from those principles of the present invention.

I claim:

1. A preseparating toilet bowl for roughly separating the liquid waste and the toilet bowl rinsing water from the solid waste comprising in combination:
   (a) a toilet bowl of a funnel-shaped tubular construction having a seat disposed at the diverging end of said toilet bowl;
   (b) a converging-diverging tubular bottom having a smooth throat section connected to the converging end of said toilet bowl in a smooth and continuous relationship and thus providing a diverging bottom for said toilet bowl;
   (c) a solid waste tube with an inlet diameter substantially greater than the diameter of said throat section of said converging-diverging tubular bottom and substantially less than the diameter of said diverging bottom of said toilet bowl, said solid waste tube disposed within said diverging bottom of said toilet bowl in a substantially coaxial relationship wherein an annular gap is provided intermediate said diverging bottom of said toilet bowl and said inlet of said solid waste tube; and
   (d) a liquid waste pipe for draining the liquid waste and the toilet rinse water collected at a closed bottom of said annular gap intermediate said diverging bottom of said toilet bowl and said solid waste tube;

whereby, the liquid waste and the toilet bowl rinsing water landing on the inner wall of said funnel-shaped toilet bowl flows down following the wall of said converging-diverging tubular bottom of said toilet bowl due to surface tension and is discharged through said liquid waste tube, while the solid waste dropped into said toilet bowl is funneled through said throat of said converging-diverging tubular bottom of said toilet bowl and drops into said solid waste tube, said solid waste tube discharging the solid waste dropped thereinto.

2. The combination as set forth in claim 1 wherein said solid waste tube includes a blocking means that closes and opens the solid waste passage through said solid waste tube.

3. The combination as set forth in claim 1 wherein said toilet bowl includes means for spray cleaning said toilet bowl.

4. An evaporative waste disposal system comprising in combination:
   (a) a preseparating toilet bowl including a converging-diverging tubular bottom having a smooth throat section that provides a diverging bottom for said toilet bowl; and a solid waste tube with an inlet diameter substantially greater than the diameter of the throat section of said converging-diverging tubular bottom and substantially less than the diameter of said diverging bottom of said toilet bowl, said solid waste tube substantially coaxially disposed within said diverging bottom of said toilet bowl providing an annular gap connected to a liquid waste tube; whereby the liquid waste and toilet bowl rinsing water landing on the inner wall of said toilet bowl flows down following the wall of said converging-diverging tubular bottom of said toilet bowl due to surface tension and is discharged through said liquid waste tube, and the solid waste funneled through said throat section of said converging-diverging toilet bottom drops straight into said solid waste tube and is discharged through said solid waste tube;

(b) a liquid waste evaporator including means for spreading the liquid waste and toilet bowl rinsing water discharged into said liquid waste evaporator through said liquid waste tube over a large surface area and further including means for circulating air through said liquid waste evaporator; whereby said liquid waste and toilet bowl rinsing water discharged into said liquid waste evaporator evaporates into the atmosphere in an accelerated phase due to a large wetted area exposed to air circulation by said means; and (c) a solid waste dryer connected to said solid waste tube including means for dehydrating the solid wastes discharged into said solid waste dryer through said solid waste tube and further including means for conveying the dried solid wastes out of said solid waste dryer.

5. The combination as set forth in claim 4 wherein said means for dehydrating the solid wastes includes means for heating the solid wastes in said solid waste dryer.

6. The combination as set forth in claim 4 wherein said means for dehydrating the solid wastes includes means for evacuating said solid waste dryer that vacuum-dries the solid wastes in said solid waste dryer.

7. The combination as set forth in claim 4 wherein said means for dehydrating the solid wastes includes a combination of heating means and evacuating means that dehydrates the solid wastes in said solid waste dryer by a combined process of heat-drying and vacuum-drying.

8. The combination as set forth in claim 4 wherein said means for conveying the dried solid wastes includes a pneumatic conveying means.

9. The combination as set forth in claim 4 wherein a dried solid waste storage bin stores the dried solid wastes discharged from said waste dryer.

10. The combination as set forth in claim 9 wherein said dried solid waste storage bin includes means for further drying and oxidizing the dried solid wastes by an aeration.

11. The combination as set forth in claim 10 wherein said dried solid waste storage bin is connected to an incinerator that incinerates the dried solid wastes.

12. The combination as set forth in claim 4 that includes a heating means preheating the air circulated through said liquid waste evaporator.

13. The combination as set forth in claim 12 wherein said heating means comprises a solar collector.

14. An evaporating-incinerating waste disposal system comprising in combination:

(a) a preseparating toilet bowl including a converging-diverging tubular bottom having a smooth throat section that provides a diverging bottom for said toilet bowl; and a solid waste tube with an inlet diameter substantially greater than the diameter of the throat section of said converging-diverging tubular bottom and substantially less than the diameter of said diverging bottom of said toilet bowl, said solid waste tube substantially coaxially disposed within said diverging bottom of said toilet bowl providing an annular gap connected to a liquid waste tube; whereby the liquid waste and toilet bowl rinsing water landing on the inner wall of said toilet bowl flows down following the wall of said converging-diverging tubular bottom of said toilet bowl due to surface tension and is discharged through said liquid waste tube, and the solid waste funneled through said throat section of said converging-diverging toilet bottom drops straight into said solid waste tube and is discharged through said solid waste tube;

(b) a liquid waste evaporator including means for spreading the liquid waste and toilet bowl rinsing water discharged into said liquid waste evaporator through said liquid waste tube over a large surface area and further including means for circulating air through said liquid waste evaporator; whereby said liquid waste and toilet bowl rinsing water discharged into said liquid waste evaporator evaporates into the atmosphere in an accelerated phase due to a large wetted area exposed to air circulation by said means; and (c) a solid waste incinerator connected to said solid waste tube including means for incinerating the solid wastes discharged into said solid waste incinerator through said solid waste tube and further including means for exhausting gases and ashes produced by said incineration of solid wastes.

15. The combination as set forth in claim 14 that includes a heating means preheating the air circulated through said liquid waste evaporator.

16. The combination as set forth in claim 15 wherein said heating means comprises a solar collector.

* * * * *